United States Patent
Watte et al.

(10) Patent No.: US 8,588,606 B2
(45) Date of Patent: Nov. 19, 2013

(54) OPTICAL NETWORK MONITOR PCB

(75) Inventors: Jan Watte, Grimbergen (BE); Gerry Branders, Sint-Truiden (BE); Juan Tomas Arias, Alcobendas Madrid (ES); Bart Volckaerts, Borerhout (BE); Hugo Thienpont, Halle (BE); Christof Debaes, Lot (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 697 days.

(21) Appl. No.: 11/995,783

(22) PCT Filed: Jun. 28, 2006

(86) PCT No.: PCT/GB2006/002385
§ 371 (c)(1),
(2), (4) Date: Jan. 15, 2008

(87) PCT Pub. No.: WO2007/010182
PCT Pub. Date: Jan. 25, 2007

(65) Prior Publication Data
US 2008/0205885 A1 Aug. 28, 2008

(30) Foreign Application Priority Data
Jul. 16, 2005 (EP) .................................... 0514680

(51) Int. Cl.
*H04B 10/08* (2011.01)
*H04B 17/00* (2006.01)
(52) U.S. Cl.
USPC ........ 398/21; 398/9; 398/10; 398/13; 398/16; 398/17; 398/20

(58) Field of Classification Search
None
See application file for complete search history.

(56) References Cited

U.S. PATENT DOCUMENTS

| | | | | |
|---|---|---|---|---|
| 4,886,335 A | * | 12/1989 | Yanagawa et al. | 385/16 |
| 5,187,362 A | * | 2/1993 | Keeble | 250/227.15 |
| 5,321,541 A | * | 6/1994 | Cohen | 398/82 |
| 5,493,437 A | * | 2/1996 | Lebby et al. | 398/139 |
| 5,708,297 A | * | 1/1998 | Clayton | 257/723 |
| 6,396,573 B1 | * | 5/2002 | Pimpinella | 356/73.1 |
| 6,396,575 B1 | | 5/2002 | Holland | |
| 6,774,348 B2 | * | 8/2004 | Guenter et al. | 250/205 |
| 6,842,236 B1 | | 1/2005 | Deutsch | |
| 2002/0131099 A1 | * | 9/2002 | Harasawa | 359/110 |
| 2002/0144738 A1 | * | 10/2002 | Unger et al. | 137/824 |
| 2003/0223756 A1 | * | 12/2003 | Tatum et al. | 398/135 |

FOREIGN PATENT DOCUMENTS

EP 1241805 A 9/2002

* cited by examiner

*Primary Examiner* — Ken Vanderpuye
*Assistant Examiner* — Darren E Wolf
(74) *Attorney, Agent, or Firm* — Faegre Baker Daniels LLP

(57) ABSTRACT

A network monitoring module for deployment in a branched optical network at a split location where the network splits into a plurality of branches, the network monitoring module is disclosed, comprising an array of transmitters for generating optical test signals, an output of each transmitter in the array being optically connected to a respective branch, a detector for receiving a remotely generated optical trigger signal which identifies a particular one of the transmitters, and a CMOS circuit for selectively triggering the transmitter identified in the optical trigger signal to transmit an optical test signal into the branch connected to that transmitter.

19 Claims, 6 Drawing Sheets

FUNCTIONAL BLOCK DIAGRAM

OPTICAL NETWORK MONITOR PCB

CROSS REFERENCE TO RELATED APPLICATIONS

This application is a U.S. National Stage patent application of PCT/2006/002385, filed Jun. 28, 2006 and designating the United States, which claims priority to European Patent Application No. 0514680, filed Jul. 16, 2005.

BACKGROUND

In a Passive Optical Network (PON), optical fibers are deployed in a central split or dual split branch arrangement in order to distribute signals from the OLT (Optical Line Transmitters) in the central office towards a plurality of ONU's at the subscriber's residence. In order to identify failures in the network that need to be restored when a subscriber lacks service, optical time domain reflectometry (OTDR) is used. For a distributed split PON, this method is inappropriate since OTDR measurements carried out from the central office cannot distinguish between the superpostition of the back reflected signals from the splitter branches. Consequently, it is not possible to locate the fault after the split branch. As a result, field technicians (technicians that have to go into the field equipped with an OTDR) are necessary to do measurements after the split branch to identify possible failures.
The negative drawbacks of this approach are (1) that it is a very expensive method that cannot be used to measure the network pro-actively on a regular basis; and (2) that for field technician measurements, connectors are needed in the outside plant in order to allow for connecting the OTDR equipment to the cable infrastructure. This can lead to connector failures over time in case cleaning precautions have not been taken into account by the field technician crews. In addition, the lifetime of the network elements where the monitoring has to be carried out is fairly reduced due to a substantial number of re-entrances in the network element. Known systems are described, for example, in U.S. Pat. No. 6,396,575 of W. R. Holland (Lucent), U.S. Pat. No. 6,771,358 of M. Shigeghara and H. Kanomori (Sumitomo), and U.S. Reissue Pat. 36471 of L. G. Cohen (Lucent).

SUMMARY

A scalable optical printed circuit board is disclosed that allows for optical monitoring in a Passive Optical Network (PON), keeping its passive optical character. The concept of the optical pcb incorporates a planar waveguide optical splitter, a detector, a CMOS transistor chip, a rechargeable battery, and a Vertical Cavity Surface Emitting Laser (VCSEL) array. A distinction can be made between a solution for a split PON where the splitters are already deployed in a splitter node and a solution for a new 'green field' PON that still needs to be deployed. For the former, a separate VCSEL transmitter device can be spliced between the splitter output port and the fiber of the distribution cable. For the latter, an integrated module can be spliced to the feeder cable from the Central Office (CO) and the distribution cable protruding to the Optical Network Units (ONUs). By means of a trigger signal that can be recognized by each VCSEL separately and that is multiplexed at the central office to the downstream traffic, a test pulse is generated at the splitter node by the VCSEL. The back reflections of this signal can be measured by an Optical Time Delay Reflectometer (OTDR) at the central office. This OTDR device can be shared for measurement of different PON's by means of fiber optic switches. By appropriate software analysing and reworking the OTDR data, operators can make a map of the loss evolution of their PON over time.

BRIEF DESCRIPTION OF THE DRAWINGS

The detailed description of the drawings particularly refers to the accompanying figures in which:
FIG. 2b is a diagram showing the internal configuration of the device depicted in exemplary FIG. 2a.

DESCRIPTION OF THE INVENTION

Figure 1:
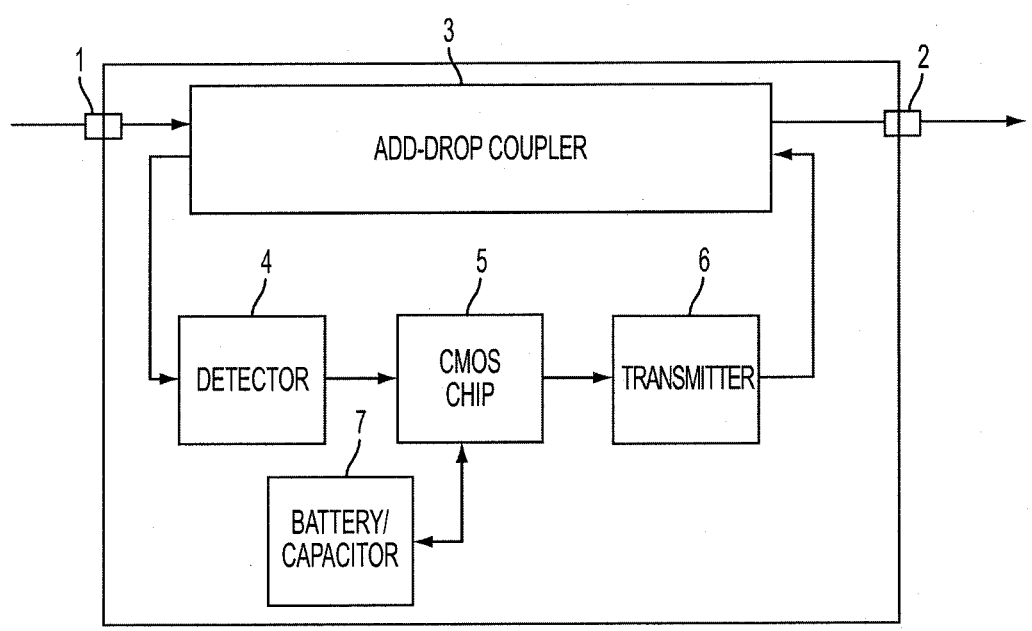
FIG. 1 is a diagram of a monitoring solution implemented with a dual port device according to an embodiment of the present disclosure.

A scalable solution for PON monitoring is presented. For a PON that is already deployed, the monitoring solution can be implemented by splicing a dual port device (see FIG. 1) or a multiple port device (see FIG. 2) into the port(s) of a splitter branch and a fiber(s) of the distribution cable (situation A).
For a green field PON that still needs to be deployed the solution consists of an optical pcb, where the planar splitter is mounted on the board. The connection between the optical devices on the board is done via optical fibers and fiber coupling devices. These fiber coupling devices can consist of alignment grooves and refractive micro lenses. The integrated module has an input port that can be spliced or connectorised to the feeder fiber and a multiple output port that can be spliced to the fibers of the distribution cable going to the ONU's. (situation B).
A schematic lay out of the concept that is needed for situation A is depicted in FIG. 1.
Port 1 is the input port of the device that is spliced or connected to an output port of the planar splitter. That can be a 250 µm coated fiber, a 900 µm coated fiber, a 3 mm cable, or a connectorised pigtail with different connectors. The same applies to the output port 2. The add/drop coupler device 3 demultiplexes a trigger (pump) signal for activating the VCSEL from the input port. For this optical device a filter WDM 10 (wavelength demultiplexer) can be used or a diffractive (binary diffractive or Fresnel diffractive) lens system like that described in U.S. Pat. No. 6,243,513 B1 can be used to decouple the pump from the input fiber. These micro optic components can if necessary be mounted on the pcb or chip via flip chip bonding techniques. The light from the pump signal impinges on the detector 4. Depending on the wavelength of the pump signal used, this can be a Si-based detector or a GaAs detector. A CMOS transistor-chip 5 collects the optical signal and boosts the power into a charge collector 7 that is rechargeable each time a VCSEL needs to be activated by a triggering signal from the Central Office. When an appropriate digital sequence is received, (intelligence that via the CMOS circuit can be built into the system) a dedicated VCSEL starts to emit a short intense pulse. The VCSEL output is collected by microlenses or other coupling optics into the add port of the add/drop coupler devices 3. As a result, the VCSEL signal is coupled in the output fiber of the transmitter device 6. This creates an OTDR pulse that starts in the selected branch and which will only propagate to one dedicated ONU. The optical sensor (of an OTDR system) at the CO will consequently receive an OTDR trace of the only selected branch.

It is clear that for this situation the pump signal to trigger the VCSELs is attenuated by the coupler. This solution can be adopted when the take rates are low and all the splitter ports are not already connected to an ONU. This should be considered as a grow-as-you-go method which is of course more expensive than the other options.

Figure 2A:
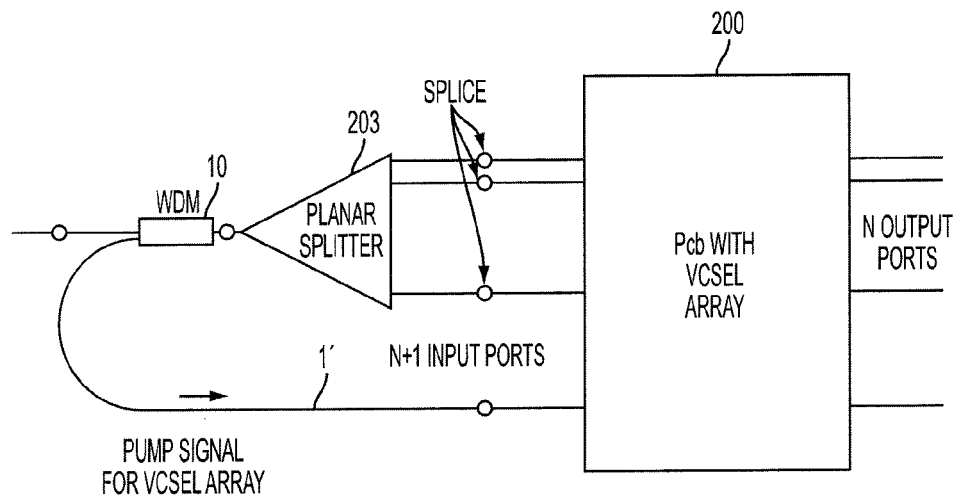
FIG. 2a is a diagram of a WDM device spliced into a feeder fiber and a splitter output port according to an embodiment of the present disclosure.

When the splitter has however no output ports available (in a "parking lot"), a filter WDM 10 can demultiplex the pump signal from the splitter port (see FIG. 2*a*). The configuration of the device depicted in FIG. 1 is then also different. It basically has N+1 input ports and N output ports. The N+1 input ports need to be spliced to the N output branches of the splitter 203 and the extra input port 1' needs to spliced to the pump demultiplexer branch of the WDM device 10 that decouples the pump light from the downstream traffic.

FIG. 2*a* shows the configuration when an extra WDM device 10 is spliced into the feeder fiber and the splitter output port. The demultiplexer port of the WDM 10 is spliced to the VCSEL array device. The output ports of the planar splitter 203 are also spliced to the VCSEL array component of the device 200.

Figure 2B:
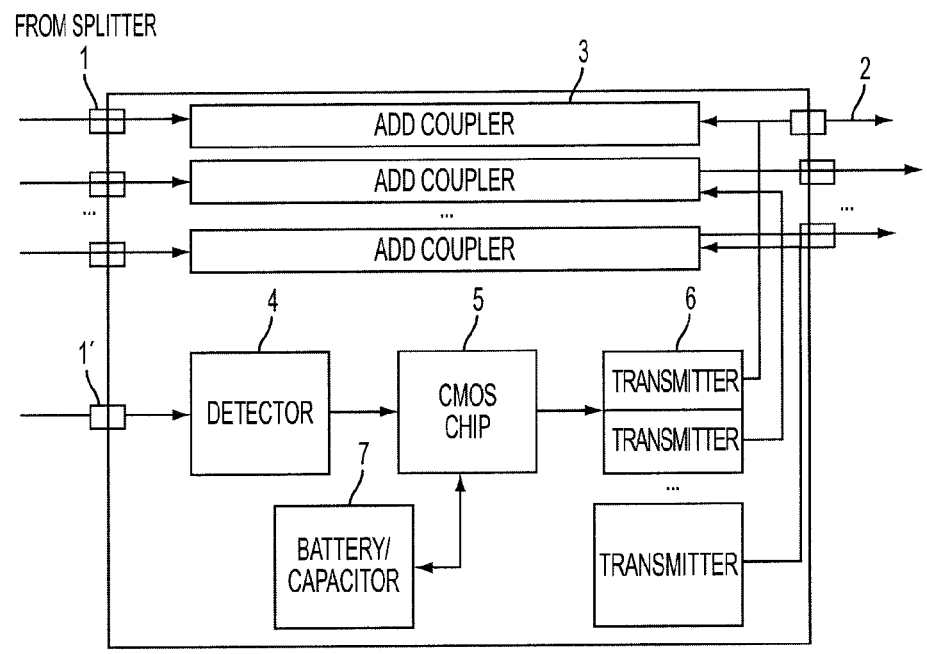

FIG. 2*b* shows the internal configuration of the device 200 depicted in FIG. 2*a*. An optical waveguide board with multiple couplers 3 that couple light from a transmitter array (preferably a VCSEL array).

Figure 3A:
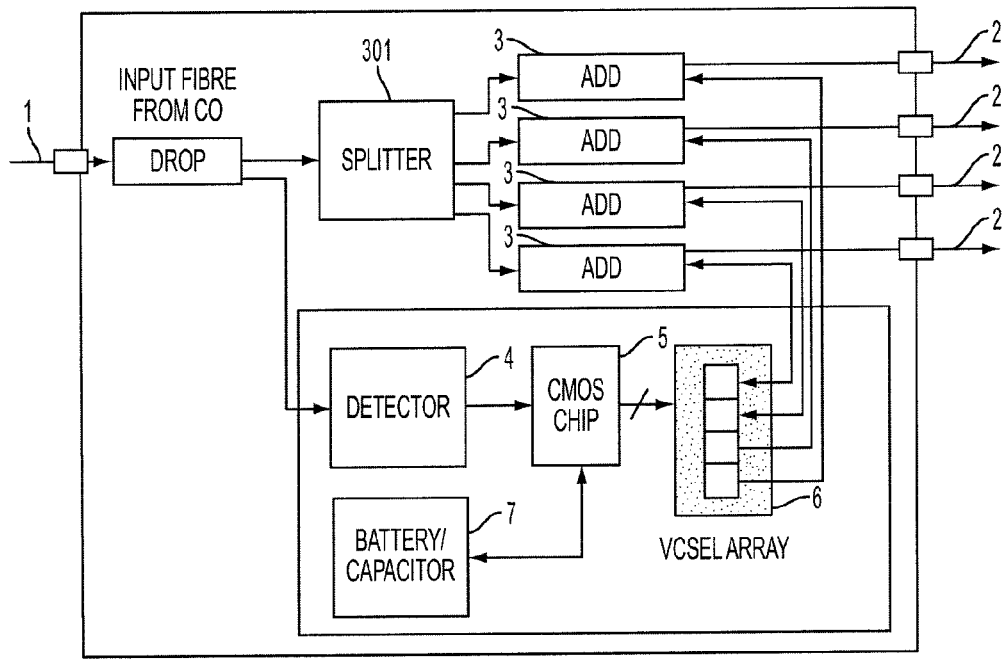
FIG. 3a is a diagram showing an integrated splitter on board solution for a green field situation according to an embodiment of the present disclosure.
Figure 3B:
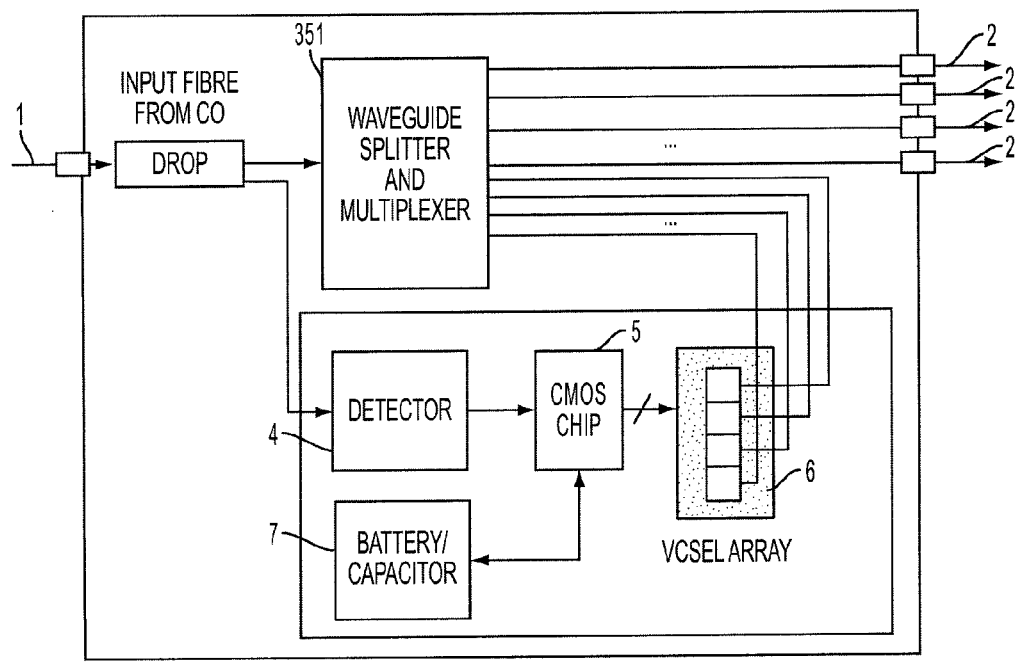
FIG. 3b is a diagram showing a planar waveguide device where the splitting of the signal and the multiplexing of the output of the VCSEL arrays is performed in the same waveguide according to an embodiment of the present disclosure.

For a green field situation however, the solution would look like the solution depicted in FIGS. 3*a* and 3*b*. For this situation there are more options possible. FIG. 3*a* shows an integrated splitter 301 on board solution. FIG. 3*b* shows an integrated splitter on board solution where the multiplexing of the VCSELs output is accomplished by the planar waveguide 351.

When integrating the planar splitter on the board one can opt for a planar waveguide device 351 where the splitting of the signal and the multiplexing of the output of the VCSEL arrays 6 is performed in the same waveguide (see FIG. 3*b*). In that case the splitter has N+1 input ports and N output ports. For N+1 inputs, one port is used to distribute the power to the N output channels. This input is spliced to the feeder cable of the CO. The other N inputs are multiplexed to the output ports and will carry the OTDR pulses from the transmitter array. The N output ports need to be spliced to the distribution cable.

Description of the Design of the Electronic Board

The electronic interface consists of four main parts. First of all we have the detector (or photovoltaic cell) that can consist of one or more series of connected photodiodes. The material system (InP, GaAs or Si) depends on the operating wavelength of the trigger signal sent from the CO. The function of the photodiode stack is twofold. First, power will be provided via the pump wavelength to boot up the circuit or to sufficiently recharge the battery. Then, in a second phase, the power of the pump will be modulated to provide an identification tag which will select which transmitter needs to fire up and generate a pulse for the OTDR trace. Further elements include an ASIC CMOS chip 5, a rechargeable battery 25 and an optical transmitter bank 26 (preferably consisting of a VCSEL array).

The functional blocks of the CMOS chip 5 that control the electronics are depicted in FIG. 4.*b*. It contains a DC/DC regulator 15 which will convert energy from the diode into a suitable voltage to recharge the battery of the module. This can be done by switching (pulse width modulation) the energy stored inside an inductor. The next element of the chip is an optical receiver 16. This is not a conventional transimpedance receiver as it should consume minimal power and is required to operate next to the voltage regulator 15. A possible scheme is to use the state of the voltage regulator 15 itself to sense to the modulation of the pump signal. Indeed, when little light is impinging on the photodiodes, the regulator will switch more slowly than when abundant light is falling on the detectors. It is clear that in this way the data-transfer rate can only be low (smaller than the PMW rate) but high transfer rates are not imperative for the application. Another possibility is the use of an extra dedicated photodiode that is only sensed for receiving the data-signals.

The signal from the optical receiver 16 is then transferred to a local shift register 18. The clocking is deduced following an asynchronous serial UART regime 20 (see FIG. 4*a*). This requires an additional local oscillator (crystal to be included on the electronic board). Another possibility for clocking is to synchronize the local clock by receiving alternating one's and zero's which are sent at the beginning of each triggering.

When the shift register 18 is filled up, the content is compared with a predetermined bit-pattern. This bit pattern is used to determine whether the communication is really intended for the module. After the receiving of the fixed bit pattern, the Finite State Machine (FSM) 22 changes state and the shift register 18 starts now to receive a new pattern which will uniquely identify one of the optical transmitters. The FSM controller 22 then checks if the indicated transmitter number is one of the transmitters for which the module is responsible. If so, it will power up the driver 26 and generate an OTDR pulse on the required channel. The module knows which channels it should respond to since it was pre-programmed during fabrication. The data can be either provided via a DIP-switch or via a programmable EEPROM. The µ-controller compares the incoming binary data with a internal memory array which is stored in the µ-controller, so that the µ-controller activates the correct VCSEL in the VCSEL array.

Figure 4A:
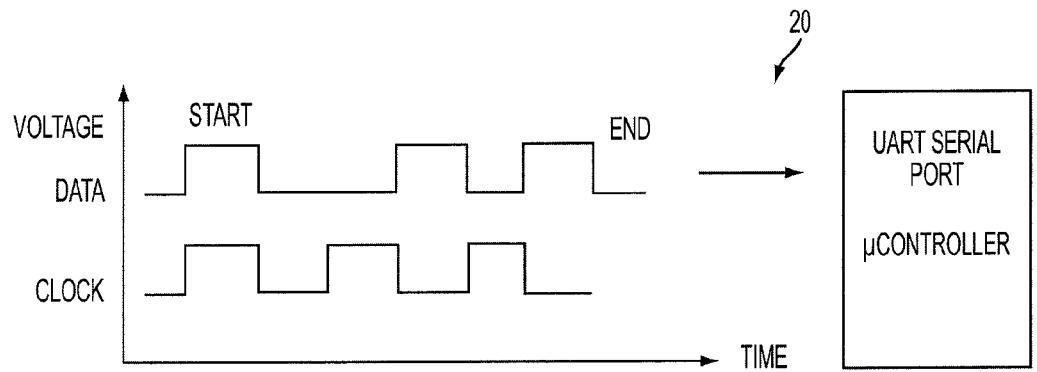
FIG. 4a is a signal diagram showing data and clock signals according to an embodiment of the present disclosure.
Figure 4B:
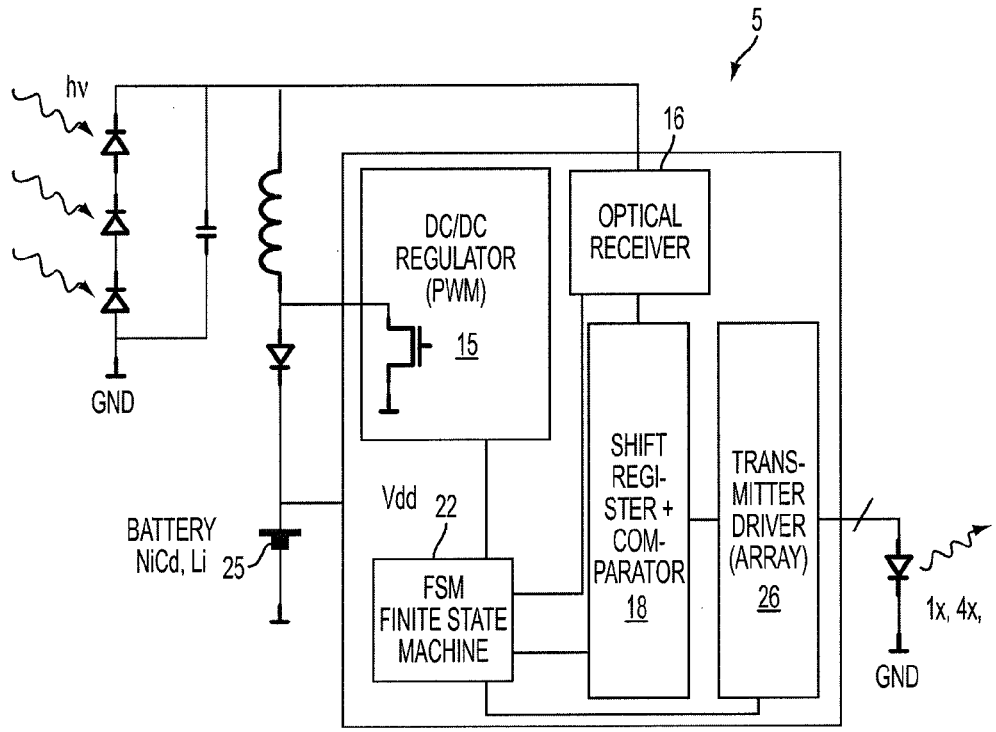
FIG. 4b is a diagram showing functional blocks of a CMOS chip according to an embodiment of the present disclosure shown in FIGS. 1, 2a, 3a, and 3b.

In FIG. 4*b* below the principle is illustrated. To power the three building parts the detector, the µ-controller and the VCSEL array, a lithium ion battery can be used or a rechargeable battery. The battery that can be used is a single cell lithium ion that produces just enough power to drive the three building parts used on the board. The recharging of the battery can be done based on two principles: the first is based on the fact that the μ-controller can function as the Li-ion battery charger. For this approach the principle of a stand alone charging Integrated Circuit (IC) is used, and this is build in an internal charging program that is active within the μ-controller and we use a Mosfet component and a sense line to sense the voltage over the battery. This is already done with a trickle charge system to correctly charge the battery. The second option is that we use external IC, a lithium ion battery charger. This IC uses an external power PMOS device to form a two chip, low cost, low dropout linear battery charger. The charge current can be set by an external resistor.

Figure 4C:
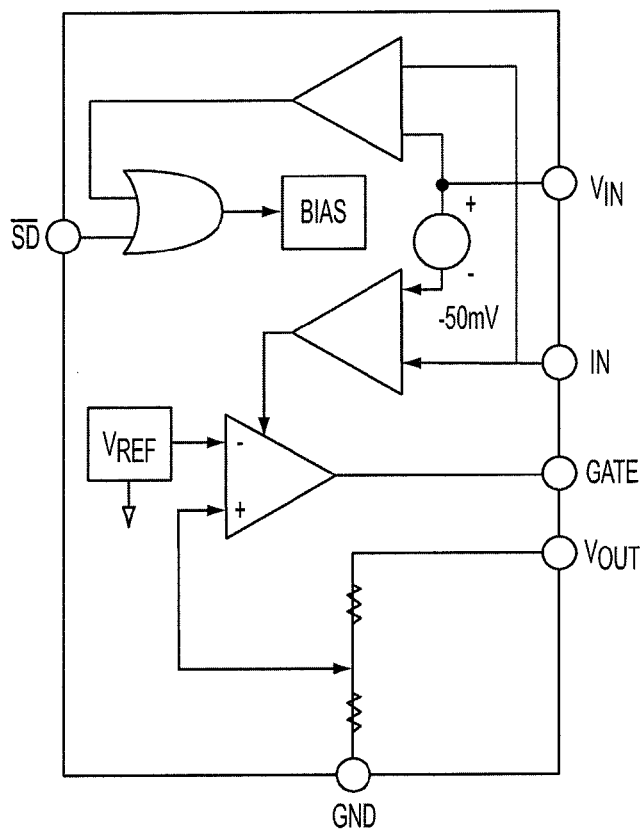
FIG. 4c is a functional block diagram of an exemplary µ-controller and inputs for a µ-controller showing battery charging functionality according to an embodiment of the present disclosure.
Figure 4C:
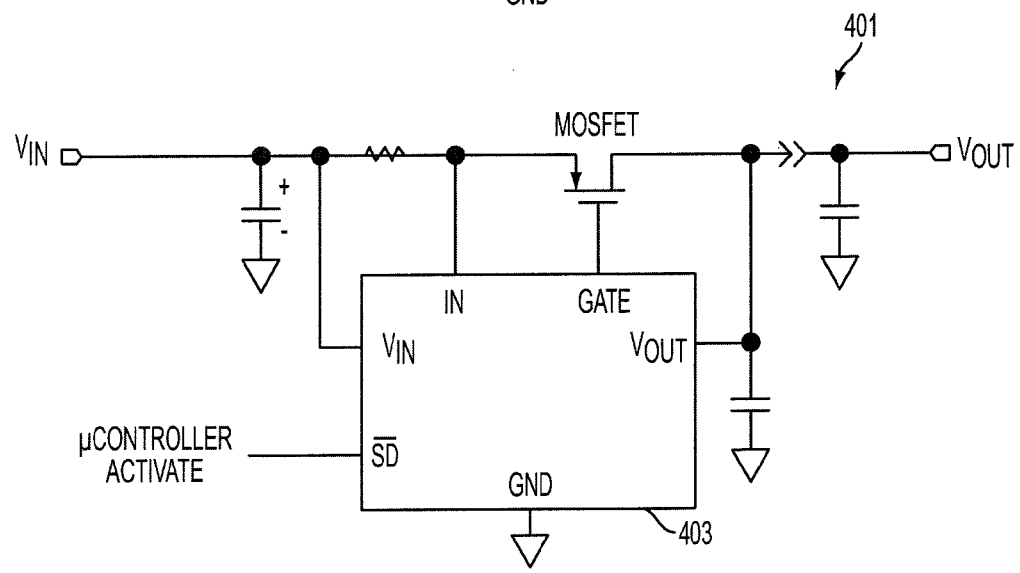

These two principles are further illustrated in the functional block diagram 401 FIG. 4c of an exemplary μ-controller 403. The recharge of the lithium ion battery is accomplished when there is no signal on the UART of the μ-controller, or we can receive a specific code on the UART that triggers the μ-controller to recharge the lithium ion battery.

Figure 5A:
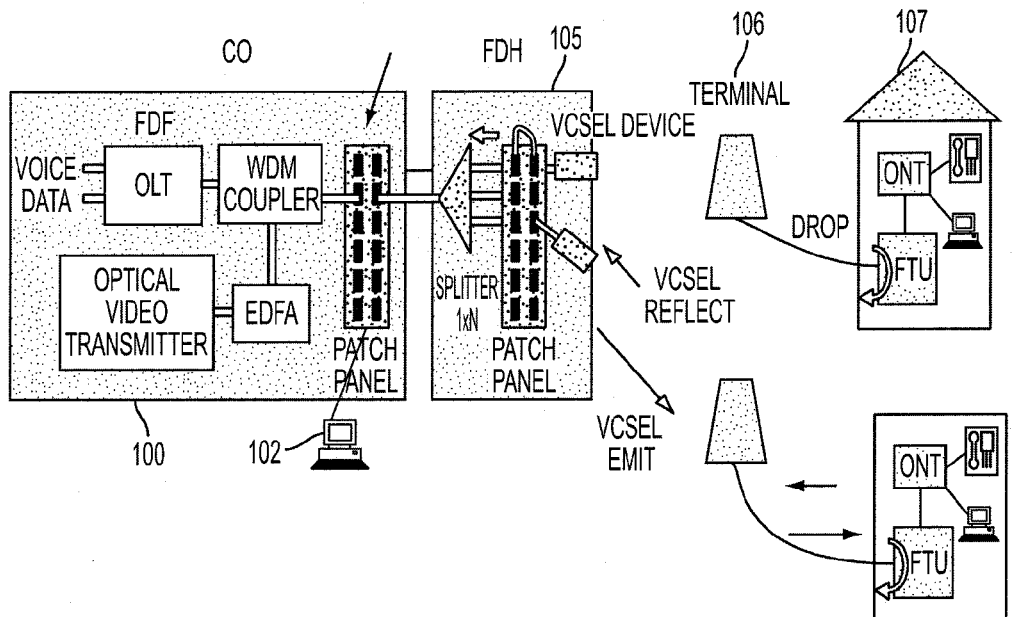
FIG. 5a is a diagrammatic view of exemplary monitoring where a planar splitter is active in the splitter node according to an embodiment of the present disclosure.
Figure 5B:
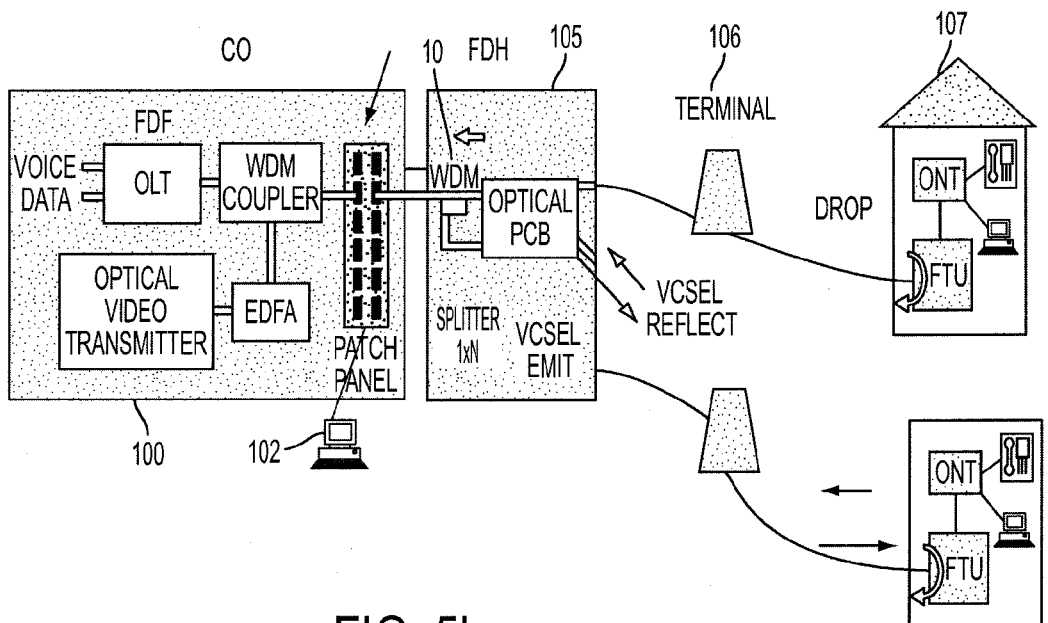
FIG. 5b is a diagrammatic view of exemplary monitoring where a planar splitter is not deployed and a planar splitter on board solution can be integrated in an outside plant network element according to an embodiment of the present disclosure.
Corresponding reference characters indicate corresponding parts throughout the several views. The exemplifications set out herein illustrate exemplary embodiments of the disclosure and such exemplifications are not to be construed as limiting the scope of the disclosure in any manner.

FIG. 5a. shows how monitoring can be done in situation A where the planar splitter is already active in the splitter node. FIG. 5b. shows how monitoring is accomplished in situation B where the planar splitter is not deployed yet and a planar splitter on board solution can be integrated in an outside plant network element. By means of a pump signal that can trigger one particular VCSEL transmitter in a separate device or in an integrated solution on board, the VCSEL sends out a pulse. This signal is back reflected and can be demultiplexed in the Central office and measured by an OTDR. Due to the fact that one particular VCSEL sending a signal to one of the N ONU's can be triggered, the problem that for conventional OTDR measurements from the central office the OTDR signals after the splitter branch are superimposed is overcome.

In FIG. 5a it is shown that in the Central Office 100 voice and data traffic is multiplexed with video traffic and connected with the feeder cable 120, that runs to the splitter node 104 where the splitting is done at once (centralised) or can be done over two branches (not shown). An OTDR set up 102 is placed in the central office and connected to the demultiplexed test signals from the VCSELs that are placed into the field. For situation A as described above the transmitter devices 105 that remotely can be triggered are spliced into the network. Two options are feasible or N separate devices can be spliced to the splitter output port and the fibers of the distribution cable (grow as you go option). Or a WDM device 10 is spliced just before the splitter demultiplexing the pump triggering signal. The output ports of the splitter and the demultiplexer port of the WDM 10 can be spliced to the N+1 input ports of the optical pcb board device housing electronic components and the VCSEL array 105. Upon triggering a VCSEL the back reflections can be measured by the OTDR in the central office. The back reflected signals can provide loss and fault information of the traject from the splitter node to the tap terminal 106 and the last drop to the subscriber's residence 107. In FIG. 5b the green field situation is depicted allowing for a connector loss solution in the outside plant. The monitoring procedure is just the same as in FIG. 5a.

The invention claimed is:

1. A network monitoring module for deployment in a branched optical network at a split location including a splitter where the network splits from a distribution cable into a plurality of branches, the network monitoring module comprising:
   an array of transmitters configured to be provided at the split location for generating optical test signals, wherein a separate transmitter is configured to be optically connected to each branch;
   a detector configured to be optically connected to the distribution cable at the split location for receiving an optical trigger signal which identifies a particular one of the transmitters, the optical trigger signal being generated by a trigger signal generator optically connected to the distribution cable and positioned remotely from the split location;
   a drop splitter for splitting the optical trigger signal from the distribution cable;
   a CMOS circuit for selectively triggering the transmitter identified in the optical trigger signal to transmit an optical test signal; and
   a plurality of couplers, each coupler configured to couple the optical test signal downstream into the branch connected to the triggered transmitter and configured to pass a reflected test signal upstream to the splitter and distribution cable;
   wherein the optical test signal is configured to produce a reflection to be monitored by a monitor optically connected to the distribution cable and positioned remotely from the split location.

2. The module according to claim 1, further comprising a multiplexer for multiplexing an output of one of the array on transmitters downstream into the branch connected to the transmitter.

3. The module according to claim 1, wherein the drop splitter is a waveguide splitter.

4. The module according to claim 1, wherein the array of transmitters comprises an array of Vertical Cavity Surface Emitting Laser devices.

5. The module according to claim 1, further comprising an add/drop coupler device for demultiplexing the optical trigger signal.

6. The module according to claim 1, further comprising one of a capacitor, a battery, a rechargeable battery, and a charge collector for the module.

7. The module according to claim 6, wherein the CMOS circuit boosts power from the detector for charging one of the charge collector, the capacitor, and the rechargeable battery.

8. A branched optical network, comprising:
   a network monitoring module for deployment in a branched optical network at a split location including a splitter where the network splits from a distribution cable into a plurality of branches, the network monitoring module comprising:
   a drop splitter for splitting an optical trigger signal from the distribution cable, the optical trigger signal being generated by a trigger signal generator optically connected to the distribution cable and positioned remotely from the split location;
   an array of transmitters provided at the split location for generating optical test signals, each of the transmitters configured to be optically connected to a different respective branch of the plurality of branches, the optical test signal being configured to produce a reflection to be monitored by a monitor optically connected to the distribution cable and positioned remotely from the split location;
   a detector optically connected to the distribution cable at the split location for receiving the optical trigger signal, the optical trigger signal identifying a particular one of the transmitters;
   a CMOS circuit for selectively triggering the transmitter identified in the optical trigger signal to transmit an optical test signal; and
   a plurality of couplers, each coupler configured to couple the optical test signal from one of the array of transmitters downstream into the branch connected to that transmitter and configured to pass a reflected test signal upstream to the splitter and distribution cable.

9. The branched optical network according to claim 8, wherein the optical test signal is a test pulse and the monitor is an Optical Time Delay Reflectometer for monitoring reflections caused by the test pulse.

10. A method of monitoring an optical network including branches from a distribution cable, the method for use with a monitoring module with optical transmitters, each transmitter being individually optically connected to a different respective branch at a split location including a splitter where the network splits from the distribution cable into the branches, the method comprising:

generating an optical trigger signal in the distribution cable, wherein the optical trigger signal is generated by a trigger signal generator optically connected to the distribution cable and positioned remotely from the split location, the optical trigger signal identifying a particular one of the transmitters;

splitting the trigger signal from the distribution cable with a drop splitter positioned at the split location;

detecting the trigger signal with a detector optically connected to the distribution cable at the split location;

determining the transmitter identified in the optical trigger signal and selectively triggering the transmitter identified in the optical trigger signal;

coupling with one of plurality of couplers at the split location the optical test signal downstream into the branch connected to the transmitter identified in the optical trigger signal; and monitoring in the distribution cable at a position remote from the split location reflections caused by the optical test signal, wherein the couplers pass the reflections upstream to the drop splitter and distribution cable.

11. The branched optical network according to claim 8, wherein the network monitoring module further comprises a rechargeable charge collector providing power for the transmitter, the rechargeable charge collected being one of a capacitor, a battery, a rechargeable battery, and a charge collector for the module.

12. The branched optical network according to claim 11, wherein the CMOS circuit boosts power from the detector for charging the rechargeable charge collector.

13. The branched optical network according to claim 8, wherein the network monitoring module further comprises a multiplexer for multiplexing an output of one of the array on transmitters downstream into the branch connected to the transmitter.

14. The branched optical network according to claim 13, wherein the network monitoring module further comprises an add/drop coupler device for demultiplexing the optical trigger signal.

15. The branched optical network according to claim 8, wherein the drop splitter is a waveguide splitter.

16. The branched optical network according to claim 8, wherein the array of transmitters comprises an array of Vertical Cavity Surface Emitting Laser devices.

17. The method according to claim 10, further comprising providing power for the transmitter with a rechargeable charge collector, wherein the CMOS circuit boosts power from the detector for charging the rechargeable charge collector.

18. The method according to claim 10, wherein the drop splitter is a waveguide splitter.

19. The method according to claim 10, wherein the optical transmitters comprise an array of Vertical Cavity Surface Emitting Laser devices.

\* \* \* \* \*